H. V. NYE.
DYNAMO ELECTRIC MACHINE.
APPLICATION FILED NOV. 9, 1910.

1,209,992.

Patented Dec. 26, 1916.

Witnesses
John L. Johnson
Chas. L. Byron

Inventor
Henry V. Nye
By Chas. E. Lord
Attorney

UNITED STATES PATENT OFFICE.

HENRY V. NYE, OF WEST ALLIS, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,209,992.   Specification of Letters Patent.   Patented Dec. 26, 1916.

Application filed November 9, 1910. Serial No. 591,427.

*To all whom it may concern:*

Be it known that I, HENRY V. NYE, a citizen of the United States, residing at West Allis, in the county of Milwaukee and State of Wisconsin, have invented certain new and useful Improvements in Dynamo-Electric Machines, of which the following is a full, clear, and exact specification.

This invention relates to translating devices and particularly to means for cooling such devices, especial attention being directed to the cooling of dynamo-electric machines.

In dynamo-electric machines, especially motors which vary in speed, it is often difficult to obtain sufficient ventilation with the low speeds because ventilation varies with the speed. Thus it often happens that machines which keep sufficiently cool at the high speeds, heat up excessively at the lower speeds because of the diminished ventilating effect.

The object of this invention is to provide novel and useful means for maintaining dynamo-electric machines cool, said means being of simple and durable construction, and reliable under all conditions of operation.

The various novel features of the invention will be described in the specification and particularly set forth in the appended claims.

This invention is illustrated in the accompanying sheet of drawings in which—

Figure 1:
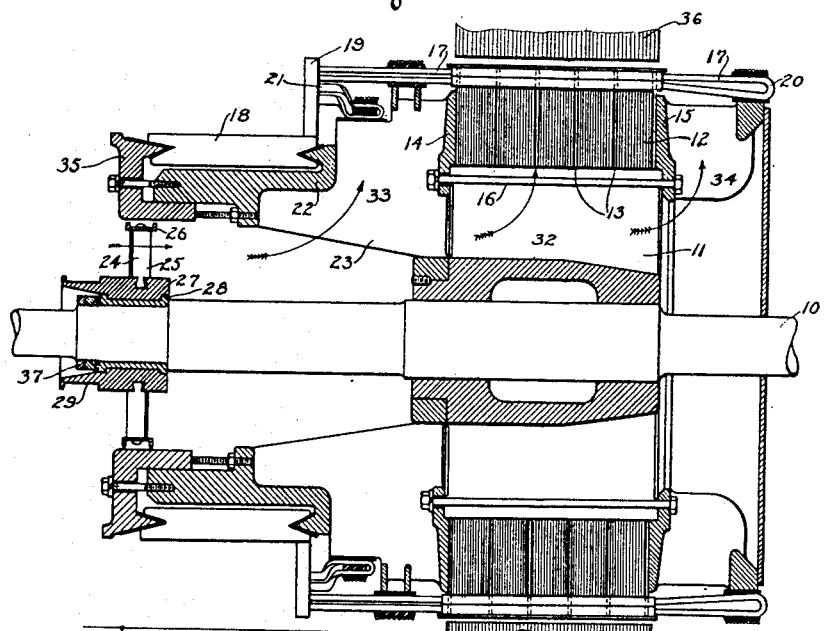
Figure 4:
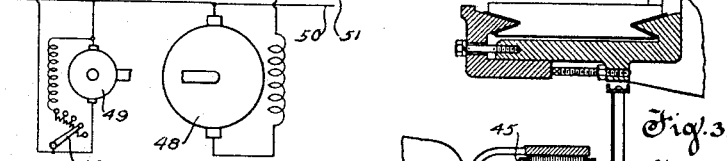
Figure 2:
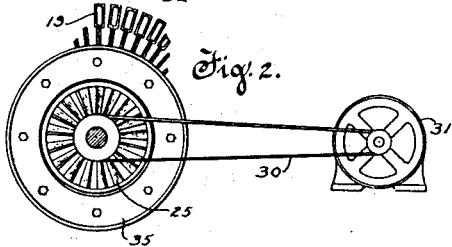
Figure 3:
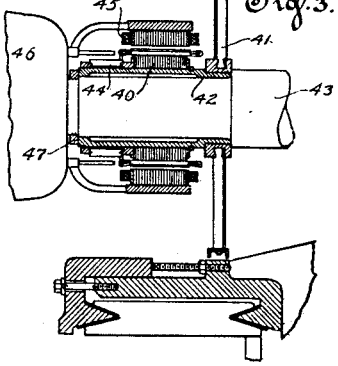

Figure 1 is a longitudinal elevation, partly in section, of a dynamo-electric machine equipped with my invention; Fig. 2 is a side elevation of the same showing one method by which a fan or ventilator is actuated; Fig. 3 is a longitudinal elevation, partially in section, of a modification of that shown in Figs. 1 and 2; and Fig. 4 is a diagrammatic view showing the electrical connections of the main motor and of the motor for driving the ventilator.

Mounted upon the shaft 10 and secured thereto is a spider 11, upon which is mounted a laminated core 12. This laminated core is made up of groups of laminæ, which are spaced relatively to each other to form circumferential ventilating passageways 13 arranged axially of the machine. The laminated core is held securely in position by end heads 14 and 15, which are drawn toward each other by bolts 16. The core is provided with slots for the reception of coils 17, which are connected to a commutator 18 by commutator leads 19. The end turns 20 and end connectors 21 of the winding are supported and retained in position in any suitable manner. The commutator 18 is supported by an annular member 35, which is secured to flanges 22 formed integrally with ribs 23 of the end head 14. The whole interior of the rotor is a skeleton structure having large open ventilating spaces and passageways.

In order to maintain the machine cool under all conditions of operation, cooling means comprising a rotary fan 24 loosely mounted on the shaft 10 has been provided. This fan is made up of blading 25 secured to a shroud ring 26 and another annular member 27, which is adapted to rotate on Babbitt metal 28 formed on and secured by nuts 37 to the shaft 10. This annular member 27 is provided with a grooved portion 29 for the reception of a belt 30, which is connected to a motor 31 for driving the fan. The fan is rotatably mounted on the shaft of the dynamo-electric machine to be kept cool, and its speed of rotation is independent of any motion of the shaft 10 or rotor of the machine.

When the motor 31 is in operation the fan 24 is rotated upon the shaft 10, the fan drawing in air from the outside of the machine and forcing it through the various ventilating passageways 32, 33, 34, and 13 as indicated by the arrows. By means of this arrangement the different parts of the rotating structure and also the stator structure, only the part 36 of which is here shown, are thus ventilated and kept cool.

Under ordinary high speed operating conditions the rotor with fans arranged in some common way would ventilate the machine sufficiently, but where the machine is one of variable speed and the ventilation depending directly upon the speed of the machine, it is readily apparent that at times the ventilation would not be great enough to maintain the machine in an efficient and safe operating condition. By means of the arrangement here shown with a fan rotatably mounted on the shaft of the dynamo-electric machine to be cooled and rotatable independently thereof by a motor 31, any degree of ventilation can be obtained and maintained under all conditions of operation.

Instead of having the ventilating fan belted to and driven by a small motor a few feet away from the machine to be cooled, the ventilator or fan can be rotatably mounted on the main motor shaft as before but have the fan direct connected to the armature of a small auxiliary motor also rotatably mounted on the main motor shaft of the machine to be cooled. In other words, the armature of the auxiliary motor and the fan can be taken as a unit and slipped onto the main motor shaft. In this case the armature and the fan directly connected thereto can be rotated independently of the main motor shaft. The main motor could be at a standstill and at the same time the auxiliary motor and fan could be rotating on the main motor shaft at any desired rate of speed.

As here shown the armature 40 and fan 41 are mounted as a unit on a sleeve 42, which is mounted on and adapted to rotate independently of the movement of the main motor shaft 43, upon which is adapted to be secured the armature of the machine to be cooled. This auxiliary motor is provided with the usual commutator 44 and field structure 45, the latter of which is supported by one of the main motor bearings 46. The armature of the auxiliary motor is prevented from sliding off the motor shaft by a nut 47, which engages a threaded portion of said shaft.

This ventilating arrangement is illustrated in connection with a main motor which has a variable speed, but the invention is not limited to this type of a machine as the invention can be applied to a constant speed machine equally as well. The invention can further be used in connection with different kinds, types, and classes of translating devices. The small fan-driving motors illustrated here can have their speeds varied to meet the ventilating requirements. In the diagram in Fig. 4 the main motor 48 and auxiliary motor 49 are connected across the same supply mains 50 and 51, but the auxiliary motor is provided with a rheostat 52 so that the speed of the auxiliary motor can be varied independently of the speed of the main motor.

It is evident that other arrangements can be made, also that there may be many modifications of the precise form here shown and described, and I aim in my claims to cover all such modifications which do not involve a departure from the spirit and scope of my invention.

What I claim as new is:

1. In combination, a dynamo-electric machine having a shaft and an overhanging commutator, and a unit comprising another dynamo-electric machine and a fan connected thereto, the rotatable element of said unit being mounted on and independently rotatable about said shaft within said overhanging commutator for cooling said first dynamo-electric machine.

2. In a dynamo-electric machine, a shaft and a bearing therefor, the rotating part of said machine being secured on said shaft, an electric motor, the rotor of which is mounted to rotate relatively to said shaft, and a ventilating fan mounted on the rotor of said motor, the stator of said motor being supported by said bearing and said motor and fan being disposed beneath a projecting part of said rotating part.

Milwaukee, Wis., Nov. 4, 1910.

In testimony whereof I affix my signature, in the presence of two witnesses.

HENRY V. NYE.

Witnesses:
 CHAS. L. BYRON,
 TEKLA BAST.